(12) United States Patent
Peters et al.

(10) Patent No.: US 9,198,442 B2
(45) Date of Patent: Dec. 1, 2015

(54) METHOD AND INSTALLATION FOR PROCESSING SLAUGHTERED POULTRY

(75) Inventors: Erik Hendrikus Werner Peters, Boxmeer (NL); Petrus Wilhelmus Hendrikus Cruysen, Escharen (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 8 days.

(21) Appl. No.: 14/342,168

(22) PCT Filed: Aug. 30, 2012

(86) PCT No.: PCT/NL2012/050591
§ 371 (c)(1),
(2), (4) Date: Apr. 16, 2014

(87) PCT Pub. No.: WO2013/032327
PCT Pub. Date: Mar. 7, 2013

(65) Prior Publication Data
US 2015/0150272 A1    Jun. 4, 2015

(30) Foreign Application Priority Data

Sep. 1, 2011    (NL) ..................................... 2007329

(51) Int. Cl.
*A22C 25/00*    (2006.01)
*A22C 21/00*    (2006.01)

(52) U.S. Cl.
CPC ........... *A22C 21/0053* (2013.01); *A22C 21/003* (2013.01); *A22C 21/0046* (2013.01)

(58) Field of Classification Search
CPC ............... A22C 21/00; A22C 21/0015; A22C 21/0023; A22C 21/0046; A22C 21/0053; A22C 21/06

USPC ......... 452/149–155, 157, 158, 160, 166, 167, 452/170, 177, 179, 180, 182, 183
See application file for complete search history.

(56) References Cited

U.S. PATENT DOCUMENTS 4,483,047 A    11/1984    Linville, Jr.
4,813,101 A     3/1989    Brakels et al.
(Continued)

FOREIGN PATENT DOCUMENTS

EP    1 498 036 A1    1/2005

*Primary Examiner* — Richard Price, Jr.
(74) *Attorney, Agent, or Firm* — Birch, Stewart, Kolasch & Birch, LLP

(57) ABSTRACT

Method for processing slaughtered poultry, wherein oven-ready carcasses of slaughtered poultry are conveyed by a feed conveyor (2), said feed conveyor having an endless track and carriers (2a) that are moved along said track, the feed conveyor carrier being adapted to support one carcass suspended from its legs. Each individual carcass is subjected at least one of: ●—a determination of the individual carcass weight by a weighing device (4), ●—a determination of the individual carcass size by an imaging device. For dividing the carcasses into parts use is made of a first cut-up line (10) and a second cut-up line (20), wherein each cut-up line has an associated cut-up line conveyor (11, 21), said cut-up line conveyor having an endless track and carriers (11a, 21a) that are moved along said track, each cut-up line conveyor carrier being adapted to support one carcass suspended from its legs. Each cut-up line comprises one or more cutting devices (12, 22) arranged along the track, which one or more cutting devices divide a carcass supported by a cut-up line conveyor carrier into parts.

17 Claims, 4 Drawing Sheets

(56) References Cited

U.S. PATENT DOCUMENTS

| | | | |
|---|---|---|---|
| 5,326,311 A | 7/1994 | Persoon et al. | |
| 5,453,045 A | 9/1995 | Hobbel et al. | |
| 5,668,634 A * | 9/1997 | Newman | 356/445 |
| 6,905,404 B2 * | 6/2005 | Steffler et al. | 452/149 |
| 7,837,540 B2 | 11/2010 | van den Nieuwelaar et al. | |
| 7,949,414 B2 * | 5/2011 | Blaine et al. | 700/29 |
| 8,688,267 B2 * | 4/2014 | Blaine et al. | 700/230 |
| 8,708,785 B2 * | 4/2014 | Aandewiel et al. | 452/182 |
| 8,862,262 B2 * | 10/2014 | Thorsson et al. | 700/213 |

* cited by examiner

METHOD AND INSTALLATION FOR PROCESSING SLAUGHTERED POULTRY

FIELD OF THE INVENTION

A first aspect of the present invention relates to the processing of slaughtered poultry, wherein oven-ready carcasses are divided into parts on cut-up lines.

BACKGROUND OF THE INVENTION

From the prior art it is known to cut-up oven-ready poultry carcasses with an installation having a feed conveyor and multiple cut-up lines to which carcasses are supplied by said feed conveyor.

The provision of multiple cut-up lines is primarily done as the carcasses that have to be processed on the cut-up lines have different sizes. In order to obtain optimal results from the cut-up line processing, it is common to have each cut-up line set up for a specific range of carcass size so that the cutting actions performed by the one or more cutting devices of each line yield optimal results. It is known that some poultry cutting devices even allow for real-time automatic adjustment of the one or more cutting tools, yet even their performance is enhanced if the carcass size lies within a specific range.

The carcasses are conveyed by the feed conveyor whilst being suspended from their legs, each carrier of the feed conveyor supporting a single carcass. Also the conveyor of each of the cut-up lines is embodied such that a carrier thereof supports a single carcass that is suspended by its legs from the carrier. For each cut-up line a transfer device, often embodied as a rotary overhanger device, is provided, that transfers a carcass from the feed conveyor carrier to a cut-up line conveyor carrier.

It is known from the prior art to provide in such an installation a weigher that weighs each individual carcass. As weight of the carcass is commonly considered to be fairly representative of the size of the carcass it is known to provide the installation with a computerized production control system that allocates each of the oven-ready carcasses to a specific cut-up line on the basis of the weight of the oven-ready carcass.

Examples of this prior art approach are disclosed in U.S. Pat. No. 4,813,101 and U.S. Pat. No. 5,453,045.

In U.S. Pat. No. 5,326,311 it is disclosed that the grading of the oven-ready carcasses in view of their grading into a category and resulting allocation to a specific cut-up line can be performed on the basis of a determination of the individual carcass size by an imaging device, possibly in combination with a determination of the carcass weight. The imaging device may be embodied to determine one or more dimensions of the carcass, the shape or contour of the carcass, etc.

In U.S. Pat. No. 5,326,311 a poultry processing installation is discussed that has three parallel cut-up lines; one set up for small size carcasses, one set up for intermediate size carcasses, and one set up for large size carcasses. Whilst the provision of three cut-up lines, each set for a different carcass size category, in an installation may be beneficial in view of the results of the cut-up processing of the carcasses, many (potential) poultry plant owners are reluctant to acquire such an installation due to the associated investment and operating costs.

It is therefore more common that an installation of this type has only two cut-up lines, wherein the one cut-up line is set up to process relatively small carcasses, whereas the other cut-up line is commonly set up to process relative large carcasses.

U.S. Pat. No. 4,483,047 discloses an installation with two cut-up lines, wherein a computerized control system grades each of the weighed carcasses conveyed by the feed conveyor into one of two categories:
  a lightweight category if the weight of said carcass is below a weight limit,
  a heavyweight category if the weight of said carcass is above this weight limit.

In this known embodiment the carcasses in the lightweight category are transferred from the feed conveyor to the first cut-up line conveyor, and the carcasses in the heavyweight category are transferred from the feed conveyor to the second cut-up line conveyor.

Again in view of the associated investment and operating costs, it is common for poultry processing installations with two cut-up lines that the combined carcass processing capacity of the two cut-up lines is equal or only slightly greater than the capacity of the feed conveyor such as to avoid undue idling of cut-up lines.

In some embodiments known transfer devices used for transferring carcasses to cut-up lines provide a buffer for a limited number of carcasses, commonly between 4 and 10 buffer positions, to temporarily buffer carcasses in the transition between the feed conveyor and the cut-up line conveyor. An example is disclosed in U.S. Pat. No. 7,837,540.

In practice, when operating a two cut-up lines installation, it is observed that quite frequently during the processing of a flock of birds, the situation arises that the capacity of the combination of a transfer device, even when provided with a buffer, and the associated cut-up line is—at least temporarily—insufficient to receive all the carcasses of the respective category. This is then signalled to an operator person who can then decide to either have carcasses re-allocated to the other category and then processed at the other cut-up line, or to discharge a number of carcasses from the feed conveyor, e.g. at a discharge station. This entails a reduction of quality and/or yield of the processed carcasses, may require (manual) reworking of carcass parts, and cause an undesirable burden on the operator person.

OBJECT OF THE INVENTION

The present invention aims to provide an improved two cut-up line poultry carcass processing method and installation for processing poultry carcasses on two cut-up lines to overcome or alleviate one of more of the abovementioned problems.

SUMMARY OF THE INVENTION

According to the first aspect thereof the invention provides a method, which is characterized in that
the computerized production control system grades each of the carcasses that are conveyed by the feed conveyor and are to be processed on one of the two cut-up lines into one of three categories:
  a small carcass size category,
  a large carcass size category, and
  an intermediate carcass size category,
and in that the computerized production control system determines in real-time—for the combination of the first transfer device and the first cut-up line conveyor and for the combination of the second transfer device and the second cut-up line conveyor—the capacity of each of said combinations to receive carcasses of the respective small carcass size and large carcass size category from the feed conveyor, and in that the production control system determines in real-time—for the combination of the first transfer device and the first cut-up line conveyor and for the combination of the second transfer device and the second cut-up line conveyor—the respective remaining capacity to receive carcasses from the feed conveyor in the situation that the carcasses in the small carcass size and large carcass size categories have— to the greatest extent possible—been allocated to the respective combination, and in that the production control system controls the first and second transfer devices such that the carcasses in the intermediate carcass size category are distributed over said combinations on the basis of the determined remaining capacity of each of said combinations.

In a preferred embodiment the computerized grading of the carcasses into one of said three categories is performed primarily or solely on the basis of the weight of each individual carcass. Herein it is envisaged that the production control system makes use of a first weight limit and a second weight limit that is higher than the first limit. The carcasses are the categorised as follows:
  in said small carcass size category if the weight of said carcass is below a first weight limit,
  in said large carcass size category if the weight of said carcass is above a second weight limit that is higher than the first weight limit, and
  in said intermediate size category if the weight of said carcass is between the first and second weight limits.

If weight is used a primary factor in the grading routine performed by the computerized control system, and imaging of each carcass is also performed, the control system may be configured such that the imaging results are used as a secondary factor in the grading routine. For example if a carcass has a weight close to the first or second weight limit the imaging results can be used to determine into which of the two categories delimited by said weight limit the carcass is actually grade.

The invention provides for a processing of oven-ready carcasses with two cut-up lines, and categorizing the oven-ready whole carcasses into three categories, the control system having the freedom to assign a carcass in the intermediate carcass size category to one of the two cut-up lines depending on the remaining capacity of the cut-up lines to absorb carcasses from said intermediate carcass size category.

In a practical embodiment for chicken carcasses the weight difference between the first and second weight limit may be chosen between 150 and 300 grammes. One can also envisage an embodiment of the method wherein the weight difference between the two limits is chosen such that an (estimated) percentage of the flock has a weight between the first and second weight limit, e.g. between 20% and 40% of the flock.

The inventive approach greatly alleviates the insufficient capacity problem discussed above with reference to the prior art "two category approach" in an installation with two cut-up lines, whilst at the same time allow the plant owner to dispense with the provision of a third parallel cut-up line.

As is preferred the cutting devices of the two cut-up lines are set up to process the carcasses of the respective small carcass size category or large carcass size category as well as the carcasses of the intermediate carcass size category. So both lines are then set up to process with acceptable results the carcasses from the intermediate carcass size category.

In a preferred embodiment the computerized production control system provides in real-time an insufficient capacity routine for which several options are envisaged.

In an embodiment the computerized production control system provides in real-time an operator alarm signal for an operator person if for one or both of said combinations the capacity to receive carcasses of the respective small carcass size and large carcass size category from the feed conveyor is insufficient.

In an embodiment the control system is configured to allow the operator person in real-time to cause carcasses to be removed from the feed line other than via the first and second transfer devices, e.g. by discharging them at a discharge station along the feed line, e.g. where the carcasses are collected so that they can later be reintroduced into the installation for cut-up line processing.

In an embodiment the control system may also, either in combination with the presence/operation of a discharge station or alone, be configured to allow for an operator person controlled override of the computerized category grading of carcasses in order to re-allocate one or more carcasses in said small carcass size or large carcass size category to another of said three categories. This may entail the loss of quality, meat loss, etc. of the poultry products obtained from such an override as the carcass may then be processed at the "incorrect cut-up line". However, the inventive method significantly reduces the occurrence of this situation compared to the prior art "two category approach" for two cut-lines.

In another embodiment the insufficient capacity routine involves an algorithm that controls the override of the original grading of the carcasses, wherein this override is signalled to the operator person, e.g. to request for approval of an override proposal or merely as indication that an override has occurred.

Other insufficient capacity routines of the computerized control system are also possible.

In a preferred embodiment, as is known from the prior art, it is envisaged that each of the combinations of transfer device and cut-up line has a buffer that allows to temporarily store one or more carcasses that are discharged from the feed line. The presence of a buffer enhances the possibility that all carcasses in the small size and large size categories can indeed be transferred to the appropriate cut-up line.

In an embodiment it is envisaged that the computerized control system treats the carcasses in the intermediate carcass size category as "all the same" without any further differentiation, so e.g. without taking into account the actual weight, when the system distributes these intermediate carcass size category carcasses over the two cut-up lines.

In an alternative embodiment of the system, the actual carcass weight of the carcasses in this intermediate category is taken into account in the decision process underlying the transfer of a carcass to either the small carcass size or the large carcass size combination.

In an embodiment it is envisaged that the first and second weight limits defining the three categories may be "floating limits", e.g. subject to recalculation during operation of the installation, e.g. the limits being reset for a new flock to be processed, or the limits being evaluated during the processing of a flock (e.g. to adjust the limits to the weight distribution as detected within a representative sample group of the flock).

In an embodiment the small carcass size category not only has the first weight limit A as upper limit of the weight of the carcasses but also a lower weight limit. The control system then, in an embodiment, is adapted to discharge very lightweight carcasses from the feed conveyor by another means than the first and second transfer device, e.g. at a discharge station where very lightweight carcasses are collected.

In an embodiment the large carcass size category not only has the second weight limit B as lower limit of the weight of the carcasses but also an upper weight limit. The control system then, in an embodiment, is adapted to discharge very heavy carcass from the feed conveyor by another means than the first and second transfer device, e.g. at a discharge station where very heavy carcasses are collected.

The method could also comprise that a further weight range is defined and used by the computerized control system representing carcasses that are not to be processed by any of the two cut-up lines and are to be processed in another manner, e.g. to be delivered by the feed line to a packaging station or a collection station. For example one can envisage that very heavy carcasses are collected and packaged as oven-ready whole carcasses without any further operation being carried out on the carcass itself.

The method could also comprise that specific carcasses are assigned as "not to be processed by any cut-up line", e.g. due to early observations made of the carcass, e.g. due to abnormal shape, broken portions of the carcass (e.g. as seen by X-ray imaging), etc. One can envisage that these individually tagged carcasses are delivered by the feed conveyor to a dedicated discharge station.

The first aspect of the invention also relates to a poultry processing installation that is adapted to perform the method when in operation.

A second aspect of the invention relates to a method for processing slaughtered poultry, wherein carcass breast parts, e.g. front halves, are processed on filleting lines in order to harvest poultry fillets.

As explained above for cut-up of whole oven-ready carcasses into parts it is common and well accepted to make use of just two cut-up lines, each set up to handle a respective size range of carcasses. For filleting poultry carcass breasts parts it is known to make use of more than two filleting lines, e.g. between 3 and 6 filleting lines. Each filleting line is then set up to handle a respective size category of carcass breast parts. This grading of carcass breast parts into more and basically narrower categories compared to the cutting up is primarily done to obtain more optimal results in the filleting process. Commonly breast fillets are regarded as the most appreciated poultry meat. As each filleting line will in this approach only handle as relatively small size range, the devices and associated tools for each filleting line can be optimized for such size range.

As in the situation of the cut-up lines, plant operators prefer to operate economically. In practice this means that the combined capacity of the filleting lines is equal or only slightly greater than the capacity of the feed conveyor. Otherwise idling would occur on an uneconomical scale.

The second aspect of the invention is based on the insight that the "two poultry carcass parts processing lines, three categories approach" explained with reference to the cut-up lines can also be advantageously be used to obtain an improved filleting method.

The second aspect of the invention provides a method for processing slaughtered poultry.

In this method of the second aspect of the invention carcass breast parts of slaughtered poultry are conveyed by a feed conveyor, said feed conveyor conveying a stream of individual carcass breast portions in sequential order.

It is envisaged that the feed conveyor may be embodied as a belt conveyor, whereby carcass breast parts are conveyed in sequential order, preferably one breast part being spaced in direction of conveyance from the neighbouring breast parts. In another design, the feed conveyor may comprise a carrier or receptacle for each individual breast part.

It is envisaged that each individual carcass breast part is subjected at least one of:
 a determination of the individual carcass breast part weight by a weighing device,
 a determination of the individual carcass breast part size by an imaging device, For filleting the carcass breast parts use is made of N filleting lines, wherein N is an integer number of 2 or greater, at least including a first filleting line and a second filleting line. Each filleting line is set up and used to process the carcass parts that are graded into a respective carcass breast part size category.

For example in a two filleting line situation it is envisaged that the one filleting line is set up for handling relative small size breast parts and the other filleting line for handling relative large size breast parts.

Each filleting line has an associated filleting line conveyor, said filleting line conveyor having an endless track and carriers that are moved along said track, each filleting line conveyor carrier being adapted to support one carcass breast part. The carriers may e.g. be embodied as a cone or mandrel that is introduced into a body cavity portion of the breast part, or a support block onto which is breast part is fastened.

Each filleting line comprises one or more filleting process devices, e.g. with tooling for one or more of cutting, scraping, skin removal, etc., said process devices being arranged along the track. These one or more filleting process devices perform a filleting process operation on the carcass breast part supported by a filleting line conveyor carrier. If desired, and as is known, the filleting line may comprise one or more filleting operator station, where a person can be located to perform a mainly manual filleting operation.

The filleting lines can be configured to remove from the carcass breast part not only the inner and/or outer fillets, but also one or more other meat portions, such as back and shoulder meat, possibly said meat portions being kept integral with the fillets.

If desired, a filleting line may also comprise one or more cutting devices that perform a cut-up operation wherein a portion is cut free from the carcass breast part held by the filleting line carrier, e.g. to remove a wing, or the neck. Examples thereof are disclosed in EP 1 917 859.

The installation comprises N transfer devices, such that a transfer device is arranged between the feed conveyor and each filleting line conveyor and transfers carcass breast parts from said feed conveyor to said filleting line conveyor.

For example, a first transfer device is arranged between the feed conveyor and the first filleting line conveyor and transfers carcass breast parts from said feed conveyor to said first filleting line conveyor. A second transfer device is arranged between the feed conveyor and the second filleting line conveyor and transfers carcasses from said feed conveyor to said second filleting line conveyor.

These transfer devices may e.g. each be embodied as a conveyor belt and an associated ejector device that ejects a carcass part from the feed conveyor to deposit it on the conveyor belt of the transfer device. In an embodiment with a conveyor belt in the transfer device an embodiment is envisaged wherein a person picks up a carcass breast part from the belt and places it on the carrier of the filleting line. The transfer devices may in the alternative be embodied for automated transfer of the carcass breast part onto the carrier of the filleting line, e.g. directly from the feed conveyor or from a conveyor that forms part of the transfer device.

In the second aspect of the invention use is made of a computerized production control which—based upon the determination of each individual carcass breast part made by the weighing device and/or by the imaging device—grades each of the carcass breast parts conveyed by the feed conveyor into one carcass breast part size category of N categories, at least including a first and a second carcass breast part size category, each category containing differently size carcass breast parts.

The production control system controls each transfer device such that carcass breast parts in the each carcass breast part size category are transferred—to the greatest extent possible—from the feed conveyor to the respective filleting line conveyor.

The computerized production control system makes use of an intermediate carcass breast part size category between each pair of adjacent carcass breast part categories.

The computerized production control system grades each of the carcass breast parts that are conveyed by the feed conveyor and are to be processed by one of two filleting lines that each correspond to one of said pair of adjacent breast part categories into one of three categories:
said first carcass breast part size category,
said second carcass breast part size category, and
an intermediate carcass breast part size category, The computerized production control system determines in real-time—for the combination of the first filleting line conveyor and the respective first transfer device and for the combination of the second filleting line conveyor and the respective second transfer device—the capacity of each of said combinations to receive carcass breast parts of the respective first carcass breast part size and second carcass breast part size category from the feed conveyor.

The production control system determines in real-time—for the combination of the first transfer device and the first filleting line conveyor and for the combination of the second transfer device and the second filleting line conveyor—the respective remaining capacity to receive carcass breast parts from the feed conveyor in the situation that the carcass breast parts in the first carcass breast part size and second carcass breast part size categories have—to the greatest extent possible—been allocated to the respective combination.

The production control system controls the first and second transfer devices such that the carcass breast parts in the intermediate carcass breast part size category are distributed over said combinations on the basis of the determined remaining capacity of each of said combinations.

The skilled person will appreciate that this method with two or more filleting lines and with a computerized control system that grades the carcass breast parts that are to be filleted into one of said N categories or into one of said one or more intermediate categories provides the same advantages of enhanced yield, reduced operator effort, and limited investment and operating costs as explained above with reference to the method with cut-up lines.

In a preferred embodiment the computerized grading of the carcasses into said first or second category, or into said intermediate category is performed primarily or solely on the basis of the weight of each individual carcass. Herein it is envisaged that the production control system makes use of a first weight limit and a second weight limit that is higher than the first limit. The carcasses are then categorised as follows:
in said first carcass size category if the weight of said carcass is below a first weight limit,
in said second carcass size category if the weight of said carcass is above a second weight limit that is higher than the first weight limit, and
in said intermediate size category if the weight of said carcass is between the first and second weight limits.

If in the second aspect of the invention weight is used a primary factor in the grading routine performed by the computerized control system, and imaging of each carcass breast part is also performed, the control system may be configured such that the imaging results are used as a secondary factor in the grading routine. For example if a carcass breast part has a weight close to the first or second weight limit the imaging results can be used to determine into which of the two categories delimited by said weight limit the carcass breast part is actually graded.

The inventive approach greatly avoids the frequent occurrence of the insufficient capacity problem discussed above with reference to the prior art "two category approach" in an installation with two cut-up lines, which problem is also at play in a plant with N filleting lines.

As discussed with reference to the first aspect of the invention, in a preferred embodiment the computerized production control system provides in real-time an insufficient capacity routine for which the same options as discussed are envisaged.

In a preferred embodiment, as is known from the prior art, it is envisaged that each of the combinations of transfer device and filleting line has a buffer, e.g. formed by a belt conveyor of the transfer device, that allows to temporarily store one or more carcass breast parts that are discharged from the feed line. The presence of a buffer enhances the possibility that all carcass breast parts in the relatively small carcass breast part size and relatively large carcass breast part size categories can indeed be transferred to the appropriate filleting line.

In an embodiment, just as in the first aspect of the invention, it is envisaged that the computerized control system treats the carcass breast parts in an intermediate carcass breast part size category as "all the same" without any further differentiation, so e.g. without taking into account the actual weight, when the system distributes these intermediate size category carcass breast parts over the two filleting lines of the pair of filleting lines handling the neighbouring carcass part size category.

In an alternative embodiment of the system, the actual weight of the carcass breast parts in this intermediate category is taken into account in the decision process underlying the transfer of a carcass breast part to either the relatively small size or the relatively large size combination.

As explained with reference to the first aspect of the invention, in an embodiment it is envisaged that the first and second weight limits defining the three categories may be floating limits.

The method could also comprise that specific carcass breast parts are assigned as "not to be processed by any filleting line", e.g. due to early observations made of the carcass, e.g. due to abnormal shape, broken portions of the carcass (e.g. as seen by X-ray imaging), etc. One can envisage that these individually tagged carcass breast parts are delivered by the feed conveyor to a dedicated discharge station.

For poultry filleting lines it is also known to dispense with the transfer device between the feed conveyor and the conveyor of the filleting line. Then a carcass breast part is transferred directly from the feed conveyor to a carrier of the filleting line conveyor. An example thereof is disclosed in EP 1 498 036.

The second aspect of the invention therefore also proposes a method for processing slaughtered poultry, wherein carcasses breast parts of slaughtered poultry are conveyed by a feed conveyor, said feed conveyor having an endless track and carriers that are moved along said track, each feed conveyor carrier being adapted to support one carcass breast part, e.g.

the carcass breast part being partly cut loose from an oven-ready carcass that is suspended by its legs from the carrier, wherein each individual carcass breast part is subjected at least one of:
   a determination of the individual carcass breast part weight by a weighing device,
   a determination of the individual carcass breast part size by an imaging device,
wherein for filleting the carcass breast parts use is made of a first filleting line and a second filleting line,
wherein each filleting line has an associated filleting line conveyor, said filleting line conveyor having an endless track and carriers that are moved along said track, each filleting line conveyor carrier being adapted to support one carcass breast part,
wherein each filleting line comprises one or more filleting process devices arranged along the track, which one or more filleting process devices perform a filleting process operation on the carcass breast part supported by a filleting line conveyor carrier, wherein the filleting line conveyor of each of said first and second filleting lines is adapted for direct transfer of a carcass breast part from a carrier of the feed conveyor to a carrier of the filleting line, the carriers of the filleting line conveyor e.g. each being selectively movable on command into a receiving position and a non-receiving position with respect to the feed conveyor, and being moved into the receiving position if a carcass breast part is to be transferred from a carrier of the feed conveyor to a carrier of the filleting line conveyor,
wherein use is made of a computerized production control system which—based upon the determination of each individual carcass breast part made by the weighing device and/or by the imaging device—grades each of the carcass breast parts conveyed by the feed conveyor into one carcass breast part size category of N categories, at least including a first and a second carcass breast part size category, each category containing differently size carcass breast parts,
wherein the production control system controls each transfer such that carcass breast parts in the each carcass breast part size category are transferred—to the greatest extent possible—from the feed conveyor to the respective filleting line conveyor,
wherein the computerized production control system makes use of an intermediate carcass breast part size category between each pair of adjacent carcass breast part categories, and wherein the computerized production control system grades each of the carcass breast parts that are conveyed by the feed conveyor and are to be processed by one of two filleting lines that each correspond to one of said pair of adjacent breast part categories into one of three categories:
   said first carcass breast part size category,
   said second carcass breast part size category, and
   an intermediate carcass breast part size category,
and wherein the computerized production control system determines in real-time—for the first filleting line conveyor and for the second filleting line conveyor—the capacity of each of said filleting line conveyors to receive carcass breast parts of the respective first carcass breast part size and second carcass breast part size category from the feed conveyor,
and wherein the production control system determines in real-time—for the first filleting line conveyor and for the second filleting line conveyor—a respective remaining capacity to receive carcass breast parts from the feed conveyor in the situation that the carcass breast parts in the first carcass breast part size and second carcass breast part size categories have—to the greatest extent possible—been allocated to the respective filleting line conveyor,
and wherein the production control system controls the direct transfers such that the carcass breast parts in the intermediate carcass breast part size category are distributed over said first and second filleting lines on the basis of the determined remaining capacity of each of said filleting lines.

In this method carcasses breast parts of slaughtered poultry are conveyed by a feed conveyor, said feed conveyor having an endless track and carriers that are moved along said track, each feed conveyor carrier being adapted to support one carcass breast part, and wherein the filleting line conveyor of each of said filleting lines is adapted for direct transfer of a carcass breast part from a carrier of the feed conveyor to a carrier of the filleting line.

It will be appreciated by the skilled person that this method provides the same advantages as discussed with reference to the other variant of the second aspect of the invention.

For example, as is illustrated in EP 1 498 036, the feed conveyor may convey the carcass breast part in a situation wherein it has been cut loose partly from an oven-ready carcass that is suspended by its legs from the carrier, the remaining connection being broken when the transfer takes place.

The carriers of the filleting line conveyor are possibly selectively movable on command of an actuator mechanism in various orientations with respect to the track of the conveyor, e.g. the carrier having a cone or mandrel that is insertable into a body cavity portion of the carcass breast part. For example the cone or mandrel is pivotable on command about one or more axis, e.g. including a horizontal axis and a vertical axis, with respect to a base of the carrier that is guided on the track.

In an embodiment with selective movable carriers of the filleting line one can envisage that each carrier is independently from other carriers selectively movable on command of an actuator mechanism into a receiving position and a non-receiving position with respect to the feed conveyor, and being moved into the receiving position if a carcass breast part is to be transferred from a carrier of the feed conveyor to said carrier of the filleting line conveyor. This is for example shown in EP 1 498 036.

The second aspect of the invention also relates to an installation a poultry processing installation that is adapted to perform the method when in operation.

The invention will be explained hereunder with reference to the drawings.

DETAILED DESCRIPTION OF EMBODIMENTS

Figure 1:
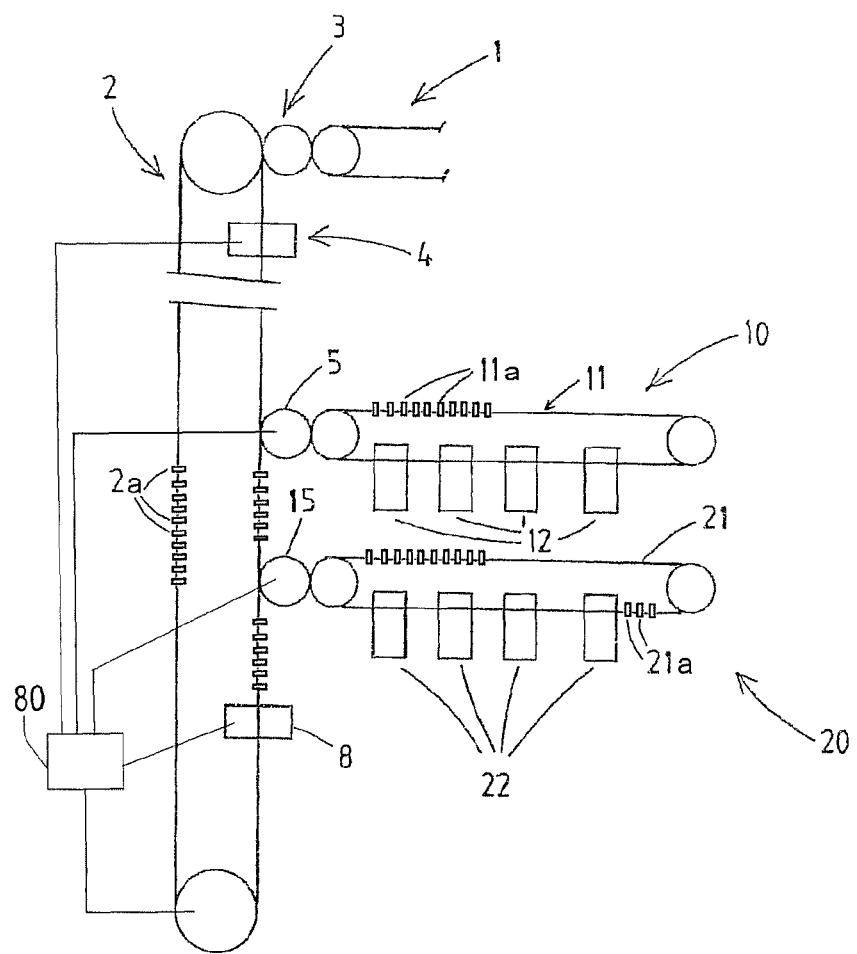
FIG. 1 shows schematically an installation for processing slaughtered poultry with a feed conveyor and two cut-up lines.

In FIG. 1 the reference numeral 1 indicates a conveyor for oven-ready carcasses of slaughtered poultry, e.g. chicken.

As is known in the art oven-ready poultry carcasses are carcasses from birds that have been killed, bleeded, defeathered, eviscerated, and chilled, commonly these steps, possibly with some additional steps as deheading, rinsing, etc., having been performed in upstream stations of the poultry processing plant.

The conveyor 1 may be an overhead conveyor with an endless track and carriers that are moved along said track, each feed conveyor carrier being adapted to support one carcass suspended from its legs.

The reference numeral 2 indicates a feed conveyor. This conveyor 2 has an endless track and carriers 2a that are moved along said track, the feed conveyor carrier 2a being adapted to support one carcass suspended from its legs. Only some carriers 2a are shown indicatively, commonly a multitude of carriers are present along the conveyor.

In order to transfer the carcasses from the respective carriers of the conveyor 1 to single-carcass carriers 2a of the conveyor 2 a transfer device 3 is arranged between the conveyors 1, 2. The transfer device 3 successively takes carcasses from the carriers of conveyor 1 and suspends each carcass with its legs from a carrier 2a of conveyor 2.

Reference numeral 4 indicates a weighing device that is adapted to determine the weight of each individual carcass that is conveyed by the feed conveyor 2. This weighing step of each individual bird does not necessarily need to be performed whilst the bird is conveyed by the feed conveyor 2, it may e.g. also be done at an upstream location, e.g. between the exit from the chill room and the feed conveyor 2. For example the transfer device 3 may be embodied as a weighing device for each individual carcass whilst it is being transferred, such an embodiment is known in the art. A weighing device may alternatively be arranged along the conveyor 1 for example.

The feed conveyor 2 serves to convey the carcasses to a first cut-up line 10 and a second cut-up line 20 of the poultry processing installation.

As is known in the art, a cut-up line serves to divide the carcasses into parts, e.g. to obtain front half, back half, whole breast, split breast, whole leg, leg with back portion, drumstick, and/or other such poultry products.

Each cut-up line 10, 20 has an associated cut-up line conveyor 11, 21 having an endless track and carriers 11a, 21a that are moved along said track. The cut-up line conveyor carriers are each being adapted to support one carcass suspended from its legs as is known in the art. Only some carriers 11a, 21a are shown indicatively, commonly a multitude of carriers are present along the conveyor.

Each cut-up line 10, 20 comprises one or more cutting devices 12, 22 arranged along the track, which one or more cutting devices divide a carcass supported by a cut-up line conveyor carrier into parts.

A first transfer device 5 is arranged between the feed conveyor 2 and the first cut-up line conveyor 11 and transfers carcasses from the feed conveyor 2 to the first cut-up line conveyor 11.

A second transfer device 15 is arranged between the feed conveyor 2 and the second cut-up line conveyor 21 and transfers carcasses from the feed conveyor 2 to the second cut-up line conveyor 21.

The provision in a poultry production installation of two parallel cut-up lines is quite common as it allows the operator to adjust the cutting processes in the one cut-up line to relative small, lightweight carcasses and in the other cut-up line to relatively large, heavy carcasses. It is noted that the cutting devices in the cut-up lines 10, 20 may be identical, as commonly a cutting device allows for some adjustment of the cutting process to the size or relevant contour or dimension of the carcass (or the remainder of the carcass after previous cutting operations).

In this description the cut-up line 10 is assumed to be set up for processing relatively small, lightweight carcasses, and the cut-up line 20 is assumed to be set-up for processing relatively large, heavy carcasses.

In order to distribute the carcasses over the two cut-up lines a computerized production control system 80 is provided. This system 80 is at least linked, e.g. by cable(s), wireless, etc., to the weighing device 4 in order to record for each individual carcass the weight and to the feed conveyor 2, so that the system is aware of the position of each weighed carcass in the feed conveyor. The system is also linked to the transfer devices 5, 15 so as to allow the controlled transfer of a particular carcass to one of the two cut-up lines 10, 20.

The computerized production control system 80 grades each of the weighed carcasses that are conveyed by the feed conveyor 2 and are to be processed by a cut-up line into one of three categories:

a small carcass size category if the weight of the carcass is below a first weight limit, a large carcass size category if the weight of the carcass is above a second weight limit that is higher than the first weight limit, and an intermediate carcass size category if the weight of the carcass is between the first and second weight limits.

It is envisaged that the cut-up lines 10, 20 are both able to process, with acceptable results, carcasses in the intermediate carcass size category.

Figure 2:
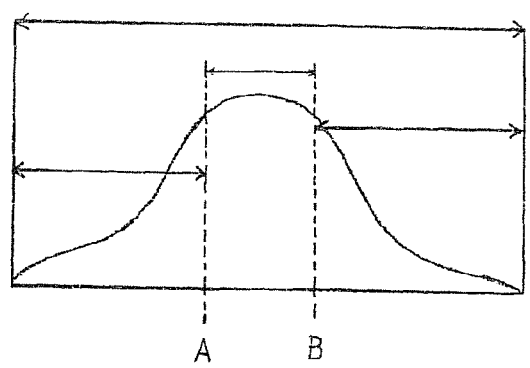
FIG. 2 shows a histogram representing the weight of birds in a flock of poultry to be processed with the installation of FIG. 1.

In FIG. 2 the histogram of a flock of chickens is shown, the weight being represented by the horizontal axis of the graph. As is often observed in practice, the majority of the carcasses have a weight rather close to the average weight of the flock. For example 95% of the flock falls within a weight range of 1000 grammes between the light carcasses and the heavy carcasses.

In FIG. 2 the line A indicates the first weight limit, whereas line B indicates the second weight limit.

In a practical embodiment for chicken carcasses the weight difference between the first and second weight limit may be between 150 and 300 grammes.

One can also envisage that this difference is chosen such that an (estimated) percentage of the flock has a weight between the first and second weight limit, e.g. between 20% and 40% of the flock.

So the small carcass size category contains carcasses having a weight less than the weight limit A, the large carcass size category a weight above the weight limit B, and the intermediate carcass size category a weight between limits A and B.

The computerized production control system 80 now determines in real-time—for the combination of the first transfer device 5 and the first cut-up line conveyor 11 and for the combination of the second transfer device 15 and the second cut-up line conveyor 21—the capacity of each of said combinations to receive carcasses of the respective small carcass size category and large carcass size category from the feed conveyor.

The production control system 80 controls the first transfer device 5 such that carcasses in the small carcass size category are transferred—to the greatest extent possible—from the feed conveyor 2 to the first cut-up line conveyor 11.

The production control system 80 controls the second transfer device 15 such that carcasses in the large carcass size category are transferred—to the greatest extent possible—from the feed conveyor to the second cut-up line conveyor 21.

It is envisaged that under normal operation conditions of the processing plant all the carcass from the small carcass size category and the large carcass size category can be transferred to the appropriate cut-up line.

The production control system 80 also determines in real-time—for the combination of the first transfer device 5 and the first cut-up line conveyor 11 and for the combination of the second transfer device 15 and the second cut-up line conveyor 21—the respective remaining capacity to receive carcasses from the feed conveyor 2 in the situation that the carcasses in the small carcass size category and large carcass size category have—to the greatest extent possible—been allocated to the respective combination.

Based upon this determination of the remaining capacity of these combinations of transfer device and cut-up line conveyor, the production control system 80 controls the first and second transfer devices 5, 15 such that the carcasses in the intermediate carcass size category are distributed over these combinations as both these combinations are able to process carcasses in said intermediate carcass size category.

This approach to the distribution of the carcasses over the two cut-up lines allows for a relatively limited capacity of the two cut-up lines compared to the capacity of the feed line.

In a preferred embodiment it is envisaged that each of these combinations of transfer device and cut-up line has a buffer that allows to temporarily store one or more carcasses that are discharged from the feed line. The presence of a buffer enhances the possibility that all carcasses in the small carcass size category and large carcass size category can indeed be transferred to the appropriate cut-up line.

Even if each combination has a buffer, a situation may arise in practice, e.g. due to a significant temporary variance of the weights of carcasses compared to the normally expected weight distribution, or e.g. due to a malfunction of a cut-up line, that the capacity of one or both of the combinations is insufficient to receive all carcasses in the respective small carcass size category and large carcass size category.

In a preferred embodiment the computerized production control system 80 provides in real-time an insufficient capacity routine for which several options are envisaged.

For instance the routine may involve providing an operator alarm signal for an operator person if for one or both of said combinations the capacity to receive carcasses of the respective small carcass size category and large carcass size category from the feed conveyor is insufficient.

The control system may then e.g. be configured to allow the operator person in real-time to cause carcasses to be removed from the feed line other than via the first and second transfer devices, e.g. by discharging them at a discharge station 8, e.g. where the carcasses are collected so that they can later be reintroduced into the installation for cut-up line processing. In an embodiment the control system may also, either in combination with the presence/operation of a discharge station 8 or alone, be configured to allow for an operator person controlled override of the computerized category grading of carcasses in order to re-allocate one or more carcasses in said small carcass size category or large carcass size category to another of said three categories. This may entail the loss of quality, meat loss, etc. of the poultry products obtained from such a carcass as the carcass may then be processed at the "incorrect cut-up line".

In another embodiment the insufficient capacity routine involves an algorithm that controls the override of the original grading of the carcasses, wherein this override is signalled to the operator person, e.g. to request for approval of an override proposal or merely as indication that an override has occurred.

In an embodiment it is envisaged that the computerized control system 80 treats the carcasses in the intermediate carcass size category as "all the same" without any further differentiation, so e.g. without taking into account the actual weight, when the system distributes these intermediate carcass size category carcasses over the two cut-up lines. In an alternative embodiment of the system, the actual carcass weight of the carcasses in this intermediate category is taken into account in the decision process underlying the transfer of a carcass to either the small carcass size or the large carcass size combination.

In an embodiment it is envisaged that the weight limits defining the categories may be "floating limits", e.g. subject to recalculation during operation of the installation, e.g. the limits being reset for a new flock to be processed, or the limits being evaluated during the processing of a flock (e.g. to adjust the limits to the weight distribution of a sample group of the flock).

In an embodiment the small carcass size category not only has the first weight limit A as upper limit of the weight of the carcasses but also a lower weight limit. The control system then, in an embodiment, is adapted to discharge very lightweight carcass from the feed conveyor by another means than the first and second transfer device, e.g. at a discharge station where these very lightweight carcasses are collected.

In an embodiment the large carcass size category not only has the second weight limit B as lower limit of the weight of the carcasses but also an upper weight limit. The control system then, in an embodiment, is adapted to discharge very heavy carcass from the feed conveyor by another means than the first and second transfer device, e.g. at a discharge station where these very heavy carcasses are collected.

Figure 3:
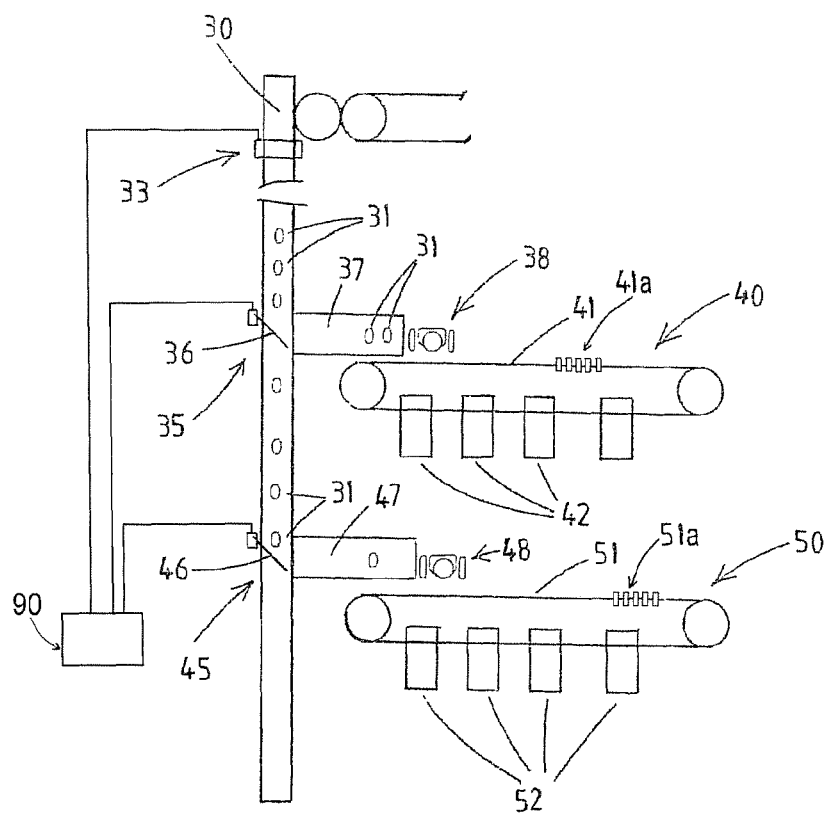
FIG. 3 shows schematically an installation for processing of slaughtered poultry carcass breast parts having a feed conveyor and two filleting lines.

FIG. 3 shows schematically an installation for processing of slaughtered poultry carcass breast parts having a feed conveyor and two filleting lines. As explained above a plant may have more than 2 filleting lines, e.g. between 3 and 6 filleting lines, each handling a respective size range of carcass breast parts. For easier understanding of the invention, this explanation is based on a two lines situation.

The installation comprises a feed conveyor 30 that conveys carcasses breast parts 31 of slaughtered poultry. In the example shown here, the feed conveyor is embodied as a belt conveyor, that conveys carcass breast parts in sequential order, preferably one breast part being spaced in direction of conveyance from the neighbouring breast parts. In another design, the feed conveyor may comprises a carrier or receptacle for each individual breast part, the carriers or receptacles being movable along an associated endless track by a drive assembly.

Reference numeral 33 indicates a station where each individual carcass breast part is subjected at least one of:
 a determination of the individual carcass breast part weight by a weighing device,
 a determination of the individual carcass breast part size by an imaging device.

For filleting the carcass breast parts use is made of a first filleting line 40 and a second filleting line 50.

Each filleting line has an associated filleting line conveyor 41, 51. The filleting line conveyors each have an endless track and carriers 41a, 51a that are moved along said track, each filleting line conveyor carrier being adapted to support one carcass breast part. Each filleting line 40, 50 comprises one or more filleting process devices 42, 52 arranged along the track, which one or more filleting process devices perform a filleting process operation on the carcass breast part supported by a filleting line conveyor carrier.

A first transfer device 35 is arranged between the feed conveyor 30 and the first filleting line conveyor 40 and transfers carcass breast parts from said feed conveyor to said first filleting line conveyor.

A second transfer device 45 is arranged between the feed conveyor 30 and the second filleting line conveyor 40 and transfers carcasses from said feed conveyor to said second filleting line conveyor.

In the example shown here each transfer device 35, 45 comprises an ejector device, here embodied as a pivotal diverter flap 36, 46, that is operated on command to eject a carcass breast part from the feed conveyor.

Each transfer device in this example further comprises a further belt conveyor 37, 47, of limited length, onto which the ejected carcass breast part is received and conveyed towards a delivery position.

In this example it is envisaged that an operator person station for an operator person 38, 48 is present at the delivery position, allowing the person to pick up the breast part and position it on a carrier 41a, 51a of the filleting line conveyor.

Use is made of a computerized production control system 90 which—based upon the determination of each individual carcass breast part made by the weighing device and/or by the imaging device at the station 33—grades each of the carcass breast parts conveyed by the feed conveyor and to be processed by a filleting line into one of three categories:
  said small carcass breast part size category,
  said large carcass breast part size category, and
  an intermediate carcass breast part size category.

The production control system 90 controls the ejection of breast parts at transfer device 35 such that carcass breast parts in the small carcass breast part size category are transferred—to the greatest extent possible—from the feed conveyor to the first filleting line conveyor 40.

The production control system 90 controls the ejection of breast parts at the transfer device 45 such that carcasses in the large carcass breast part size category are transferred—to the greatest extent possible—from the feed conveyor to the second filleting line conveyor 50.

The computerized production control system 90 determines in real-time—for the first filleting line conveyor 41 and for the second filleting line conveyor 51—the capacity of each of said filleting line conveyors to receive carcass breast parts of the respective small carcass breast part size and large carcass breast part size category from the feed conveyor.

Also the production control system 90 determines in real-time—for the first filleting line conveyor 41 and for the second filleting line conveyor 51—the respective remaining capacity to receive carcass breast parts from the feed conveyor 30 in the situation that the carcass breast parts in the small carcass breast part size and large carcass breast part size categories have—to the greatest extent possible—been allocated to the respective filleting line conveyor.

The production control system 90 also controls the transfer such that the carcass breast parts in the intermediate carcass breast part size category are distributed over said filleting line conveyors 41, 51 on the basis of the determined remaining capacity of each of said filleting line conveyors.

As explained with reference to the first aspect of the invention the example in FIG. 3 may be enhanced with further optional or preferred features.

Figure 4:
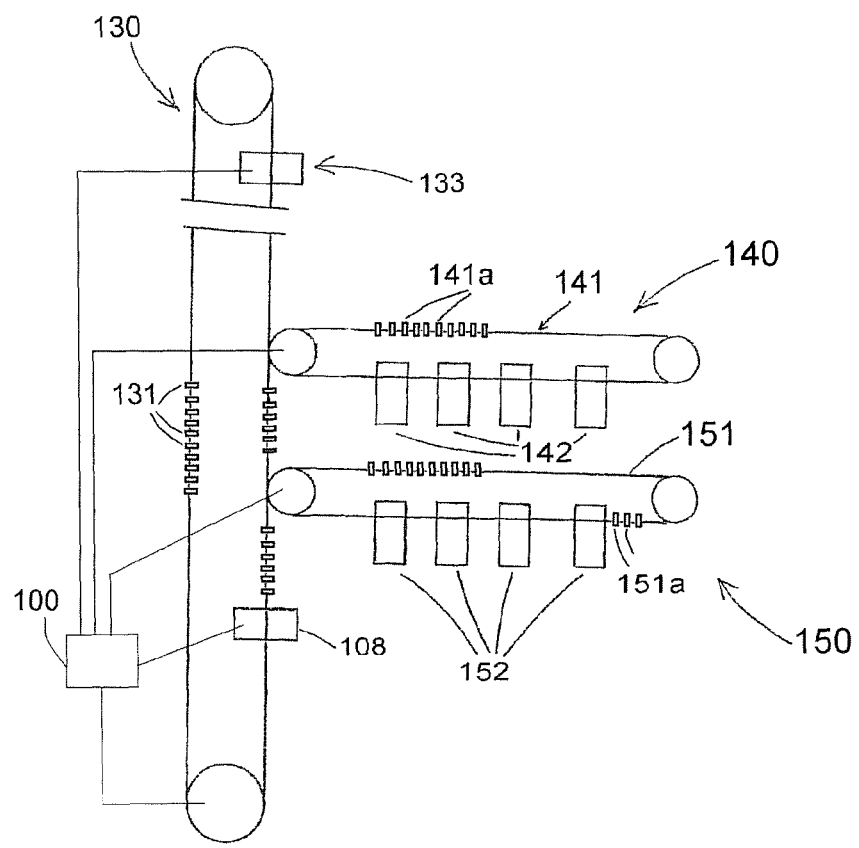
FIG. 4 shows schematically another installation for processing of slaughtered poultry carcass breast parts having a feed conveyor and two filleting lines.

FIG. 4 shows schematically an installation for processing of slaughtered poultry carcass breast parts having a feed conveyor and two filleting lines. As explained above a plant may have more than 2 filleting lines, e.g. between 3 and 6 filleting lines, each handling a respective size range of carcass breast parts. For easier understanding of the invention, this explanation is based on a two lines situation.

The installation comprises a feed conveyor 130 that conveys carcasses breast parts 131 of slaughtered poultry. In the example shown here, the feed conveyor is embodied as having an endless track and multiple carriers 131, each adapted to hold a single carcass breast part, wherein the carriers are along the associated endless track by a drive assembly.

Reference numeral 133 indicates a station where each individual carcass breast part is subjected at least one of:
  a determination of the individual carcass breast part weight by a weighing device,
  a determination of the individual carcass breast part size by an imaging device.

For filleting the carcass breast parts use is made of a first filleting line 140 and a second filleting line 150.

Each filleting line has an associated filleting line conveyor 141, 151. The filleting line conveyors each have an endless track and carriers 141a, 151a that are moved along said track, each filleting line conveyor carrier being adapted to support one carcass breast part.

Each filleting line 140, 150 comprises one or more filleting process devices 142, 152 arranged along the track, which one or more filleting process devices perform a filleting process operation on the carcass breast part supported by a filleting line conveyor carrier.

The filleting line conveyor of each of said first and second filleting lines 140, 150 is adapted for direct transfer of a carcass breast part from a carrier 131 of the feed conveyor 130 to a carrier of the filleting line 141, 151, the carriers of the filleting line conveyor e.g. each being selectively movable on command into a receiving position and a non-receiving position with respect to the feed conveyor, and being moved into the receiving position if a carcass breast part is to be transferred from a carrier of the feed conveyor to a carrier of the filleting line conveyor, Use is made of a computerized production control system 100 which—based upon the determination of each individual carcass breast part made by the weighing device 133 and/or by the imaging device—grades each of the carcass breast parts conveyed by the feed conveyor into one carcass breast part size category of N categories, at least including a first and a second carcass breast part size category, each category containing differently size carcass breast parts.

The production control system 100 controls each direct transfer such that carcass breast parts in the each carcass breast part size category are transferred—to the greatest extent possible—from the feed conveyor to the respective filleting line conveyor.

The computerized production control system 100 makes use of an intermediate carcass breast part size category between each pair of adjacent carcass breast part categories.

The computerized production control system 100 grades each of the carcass breast parts that are conveyed by the feed conveyor and are to be processed by one of two filleting lines that each correspond to one of said pair of adjacent breast part categories into one of three categories:
  said first carcass breast part size category,
  said second carcass breast part size category, and
  an intermediate carcass breast part size category, The computerized production control system determines in real-time—for the first filleting line conveyor 141 and for the second filleting line conveyor 151—the capacity of each of said combinations to receive carcass breast parts of the respective first carcass breast part size and second carcass breast part size category from the feed conveyor 130.

The production control system determines 100 in real-time—for the first filleting line conveyor 141 and for the second filleting line conveyor 151—the respective remaining capacity to receive carcass breast parts from the feed conveyor in the situation that the carcass breast parts in the first carcass breast part size and second carcass breast part size categories have—to the greatest extent possible—been allocated to the respective combination.

The production control system controls 100 the direct transfers such that the carcass breast parts in the intermediate carcass breast part size category are distributed over the first and second filleting lines 140, 150 on the basis of the determined remaining capacity of each of said filleting lines.

The control system 100 may if desired be configured to allow the operator person in real-time to cause carcasses to be removed from the feed line other than via the first and second direct transfer arrangement devices, e.g. by discharging them at a discharge station 108, e.g. where the carcasses are collected so that they can later be reintroduced into the installation for filleting.

The present application also relates to a method for processing slaughtered meat animals (e.g. selected from the group pigs, cows, fish) or parts thereof, wherein
said meat animals or parts thereof are conveyed by a feed conveyor, said feed conveyor conveying a stream of individual meat animals or parts thereof in sequential order,
wherein each individual meat animal or part thereof is subjected at least one of:
    a determination of the individual meat animal or part thereof weight by a weighing device,
    a determination of the individual meat animals or parts thereof size by an imaging device,
wherein for processing the meat animals or parts thereof by either filleting or dividing into parts, use is made of a first and a second processing line being either a first filleting line and a second filleting line, or being a first cut-up line and second cut-up line,
wherein each processing line has an associated processing line conveyor, said processing line conveyor having an endless track and carriers that are moved along said track, each processing line conveyor carrier being adapted to support one meat animal or part thereof,
wherein each filleting line, if present, comprises one or more filleting process devices arranged along the track, which one or more filleting process devices perform a filleting process operation on the carcass breast part supported by a filleting line conveyor carrier,
wherein each cut-up line, if present, comprises one or more cutting device arranged along the track, which one or more cutting devices divide the meat animal or part thereof into parts,
wherein a first transfer device is arranged between the feed conveyor and the first processing line conveyor and transfers said meat animal or part thereof from said feed conveyor to said first processing line conveyor,
wherein a second transfer device is arranged between the feed conveyor and the second processing line conveyor and transfers said meat animal or part thereof from said feed conveyor to said second processing line conveyor,
wherein use is made of a computerized production control system which—based upon the determination of each individual meat animal or part thereof made by the weighing device and/or by the imaging device—grades each of the meat animals or parts thereof conveyed by the feed conveyor into a category:
    a small size category,
    a large size category,
wherein the production control system controls the first transfer device such that meat animals or parts in the small size category are transferred—to the greatest extent possible—from the feed conveyor to the first processing line conveyor,
wherein the production control system controls the second transfer device such that meat animals or parts thereof in the large size category are transferred—to the greatest extent possible—from the feed conveyor to the second processing line conveyor,
characterized in that
the computerized production control system grades each of the meat animals or parts thereof that are conveyed by the feed conveyor and are to be processed on one of the two processing lines into one of three categories:
    said small size category,
    said large size category, and
    an intermediate size category,
and in that the computerized production control system determines in real-time—for the combination of the first transfer device and the first processing line conveyor and for the combination of the second transfer device and the second processing line conveyor—the capacity of each of said combinations to receive meat animals or parts thereof of the respective small size and large size category from the feed conveyor,
and in that the production control system determines in real-time—for the combination of the first transfer device and the first processing line conveyor and for the combination of the second transfer device and the second processing line conveyor—the respective remaining capacity to receive meat animals or parts thereof from the feed conveyor in the situation that the meat animals or parts thereof in the small size and large size categories have—to the greatest extent possible—been allocated to the respective combination,
and in that the production control system controls the first and second transfer devices such that the meat animals or parts thereof in the intermediate size category are distributed over said combinations on the basis of the determined remaining capacity of each of said combinations.

The present invention also relates to a method for processing slaughtered meat animals (e.g. selected from the group of pigs, cows, fish) or parts thereof, wherein
said meat animals or parts thereof are conveyed by a feed conveyor, said feed conveyor conveying a stream of individual meat animals or parts thereof in sequential order,
wherein each individual meat animal or part thereof is subjected at least one of:
    a determination of the individual meat animal or part thereof weight by a weighing device,
    a determination of the individual meat animals or parts thereof size by an imaging device,
wherein for processing the meat animals or parts thereof by either filleting or dividing into parts, use is made of a first and a second processing line being either a first filleting line and a second filleting line, or being a first cut-up line and second cut-up line,
wherein each processing line has an associated processing line conveyor, said processing line conveyor conveying a stream of individual meat animals or parts thereof in sequential order along a track,
wherein each filleting line, if present, comprises one or more filleting process devices arranged along the track, which one or more filleting process devices perform a filleting process operation on the meat animal or part thereof conveyed by the filleting line conveyor carrier,
wherein each cut-up line, if present, comprises one or more cutting device arranged along the track, which one or more cutting devices divide the meat animal or part thereof into parts, wherein use is made of a computerized production control system which—based upon the determination of each individual meat animal or part thereof made by the weighing device and/or by the imaging device—grades each of the meat animals or parts thereof conveyed by the feed conveyor into a category:
   a small size category,
   a large size category,
wherein the production control system controls a transfer operation such that meat animals or parts in the small size category are transferred—to the greatest extent possible—from the feed conveyor to the first processing line conveyor,
wherein the production control system controls a transfer operation such that meat animals or parts thereof in the large size category are transferred—to the greatest extent possible—from the feed conveyor to the second processing line conveyor,
characterized in that
the computerized production control system grades each of the meat animals or parts thereof that are conveyed by the feed conveyor and are to be processed on one of the two processing lines into one of three categories:
   said small size category,
   said large size category, and
   an intermediate size category,
and in that the computerized production control system determines in real-time—for the first processing line conveyor and for the second processing line conveyor—the capacity of each of said processing line conveyors to receive meat animals or parts thereof of the respective small size and large size category from the feed conveyor,
and in that the production control system determines in real-time—for the first processing line conveyor and for the second processing line conveyor—the respective remaining capacity to receive meat animals or parts thereof from the feed conveyor in the situation that the meat animals or parts thereof in the small size and large size categories have—to the greatest extent possible—been allocated to the respective processing line conveyor,
and in that the production control system controls the transfer operations such that the meat animals or parts thereof in the intermediate size category are distributed over said processing line conveyors on the basis of the determined remaining capacity of each of said processing line conveyors.

The invention claimed is:

1. A method for processing slaughtered poultry, wherein oven-ready carcasses of slaughtered poultry are conveyed by a feed conveyor, said feed conveyor having an endless track and carriers that are moved along said track, each feed conveyor carrier being adapted to support one carcass suspended from its legs,
   wherein each individual carcass is subjected to at least one of:
      a determination of the individual carcass weight by a weighing device, and
      a determination of the individual carcass size by an imaging device,
   wherein for dividing the carcasses into parts, use is made of a first cut-up line and a second cut-up line,
   wherein each cut-up line has an associated cut-up line conveyor, said cut-up line conveyor having an endless track and carriers that are moved along said track, each cut-up line conveyor carrier being adapted to support one carcass suspended from its legs,
   wherein each cut-up line comprises one or more cutting devices arranged along the track, which one or more cutting devices divide a carcass supported by a cut-up line conveyor carrier into parts,
   wherein a first transfer device is arranged between the feed conveyor and the first cut-up line conveyor and transfers carcasses from said feed conveyor to said first cut-up line conveyor,
   wherein a second transfer device is arranged between the feed conveyor and the second cut-up line conveyor and transfers carcasses from said feed conveyor to said second cut-up line conveyor,
   wherein use is made of a computerized production control system which—based on at least one of the determination of each individual carcass weight made by the weighing device and the determination of the individual carcass size by the imaging device—grades each of the carcasses conveyed by the feed conveyor and are to be processed on one of the two cut-up lines into one of three categories:
      a small carcass size category,
      a large carcass size category, and
      an intermediate carcass size category,
   wherein the production control system controls the first transfer device such that carcasses in the small carcass size category are transferred—to the greatest extent possible—from the feed conveyor to the first cut-up line conveyor,
   wherein the production control system controls the second transfer device such that carcasses in the large carcass size category are transferred—to the greatest extent possible—from the feed conveyor to the second cut-up line conveyor,
   and wherein the computerized production control system determines in real-time—for the combination of the first transfer device and the first cut-up line conveyor and for the combination of the second transfer device and the second cut-up line conveyor—the capacity of each of said combinations to receive carcasses of the respective small carcass size category and large carcass size category from the feed conveyor,
   and wherein the production control system determines in real-time—for the combination of the first transfer device and the first cut-up line conveyor and for the combination of the second transfer device and the second cut-up line conveyor—the respective remaining capacity to receive carcasses from the feed conveyor in the situation that the carcasses in the small carcass size and large carcass size categories have—to the greatest extent possible—been allocated to the respective combination,
   and wherein the production control system controls the first and second transfer devices such that the carcasses in the intermediate carcass size category are distributed over said combinations on the basis of the determined remaining capacity of each of said combinations.

2. The method according to claim 1, wherein the grading of the carcasses into said one of three categories is performed primarily or solely on the basis of the weight of each individual carcass or carcass breast part, wherein the production control system makes use of a first weight limit and a second weight limit that is higher than the first limit, the carcasses or carcass breast part being categorised:
   in said small carcass or carcass breast part size category if the weight of said carcass or carcass breast part is below a first weight limit, in said large carcass or carcass breast part size category if the weight of said carcass or carcass breast part is above a second weight limit that is higher than the first weight limit, and in said intermediate carcass or carcass breast part size category if the weight of said carcass or carcass breast part is between the first and second weight limits.

3. The method according to claim 2, wherein the control system is configured to repeatedly evaluate the first and second weight limits during the processing of a flock of poultry by analysis of the weight distribution in a sample group of carcasses or carcass breast parts.

4. The method according to claim 1, wherein the computerized production control system provides in real-time an operator alarm signal for an operator person if for one or both of said combinations the capacity to receive carcasses of the respective small carcass size and large carcass size category from the feed conveyor is insufficient, the control system possibly being configured to allow the operator person in real-time to cause carcasses to be removed from the feed line other than via the first and second transfer devices and/or to override the computerized category grading of carcasses in order to re-allocate one or more carcasses in said small size category or large carcass size category to another of said three categories.

5. The method according to claim 1, wherein the control system is configured to treat all carcasses or carcass breast parts in the intermediate carcass or carcass breast part size category without any differentiation in view of the distribution over the two cut-up lines or pair of filleting lines.

6. A method for processing slaughtered poultry, wherein carcass breast parts of slaughtered poultry are conveyed by
a feed conveyor, said feed conveyor conveying a stream of individual carcass breast parts in sequential order,
wherein each individual carcass breast part is subjected to at least one of:
a determination of the individual carcass breast part weight by a weighing device, and
a determination of the individual carcass breast part size by an imaging device,
wherein for filleting the carcass breast parts, use is made of N filleting lines, wherein N is an integer number of 2 or greater, at least including a first filleting line and a second filleting line,
wherein each filleting line has an associated filleting line conveyor, said filleting line conveyor having an endless track and carriers that are moved along said track, each filleting line conveyor carrier being adapted to support one carcass breast part,
wherein each filleting line comprises one or more filleting process devices arranged along the track, which one or more filleting process devices perform a filleting process operation on the carcass breast part supported by a filleting line conveyor carrier,
wherein the installation comprises N transfer devices, such that a transfer device is arranged between the feed conveyor and each filleting line conveyor and transfers carcass breast parts from said feed conveyor to said filleting line conveyor,
wherein use is made of a computerized production control system which—based upon the determination of each individual carcass breast part made by the weighing device and/or by the imaging device—grades each of the carcass breast parts conveyed by the feed conveyor into one carcass breast part size category of N categories, at least including a first and a second carcass breast part size category, each category containing differently size carcass breast parts,
wherein the production control system controls each transfer device such that carcass breast parts in the each carcass breast part size category are transferred—to the greatest extent possible—from the feed conveyor to the respective filleting line conveyor,
wherein
the computerized production control system makes use of an intermediate carcass breast part size category between each pair of adjacent carcass breast part categories,
and wherein the computerized production control system grades each of the carcass breast parts that are conveyed by the feed conveyor and are to be processed by one of two filleting lines that each correspond to one of said pair of adjacent breast part categories into one of three categories:
said first carcass breast part size category,
said second carcass breast part size category, and
an intermediate carcass breast part size category,
and wherein the computerized production control system determines in real-time—for the combination of the first filleting line conveyor and the respective first transfer device and for the combination of the second filleting line conveyor and the respective second transfer device—the capacity of each of said combinations to receive carcass breast parts of the respective first carcass breast part size category and second carcass breast part size category from the feed conveyor,
and wherein the production control system determines in real-time—for the combination of the first transfer device and the first filleting line conveyor and for the combination of the second transfer device and the second filleting line conveyor—the respective remaining capacity to receive carcass breast parts from the feed conveyor in the situation that the carcass breast parts in the first carcass breast part size and second carcass breast part size categories have—to the greatest extent possible—been allocated to the respective combination,
and wherein the production control system controls the first and second transfer devices such that the carcass breast parts in the intermediate carcass breast part size category are distributed over said combinations on the basis of the determined remaining capacity of each of said combinations.

7. The method according to claim 6, wherein the computerized production control system provides in real-time an operator alarm signal for an operator person if for one or both of said filleting lines or combination of filleting line and transfer device the capacity to receive carcass breast parts of the respective first carcass breast part size and second carcass breast part size category from the feed conveyor is insufficient, the control system possibly being configured to allow the operator person in real-time to cause carcass breast parts to be removed from the feed line other than via the first and second transfer devices or the filleting conveyor, and/or the control system possibly being configured to allow the operator to override the computerized category grading of carcasses in order to re-allocate one or more carcasses in said first carcass breast part size category or second carcass breast part size category to another of said three categories.

8. The method according to claim 6, wherein the grading of the carcasses into said one of three categories is performed primarily or solely on the basis of the weight of each individual carcass or carcass breast part, wherein the production control system makes use of a first weight limit and a second weight limit that is higher than the first limit, the carcasses or carcass breast part being categorised:

in said small carcass or carcass breast part size category if the weight of said carcass or carcass breast part is below a first weight limit, in said large carcass or carcass breast part size category if the weight of said carcass or carcass breast part is above a second weight limit that is higher than the first weight limit, and in said intermediate carcass or carcass breast part size category if the weight of said carcass or carcass breast part is between the first and second weight limits.

9. The method according to claim 6, wherein the control system is configured to treat all carcasses or carcass breast parts in the intermediate carcass or carcass breast part size category without any differentiation in view of the distribution over the two cut-up lines or pair of filleting lines.

10. A method for processing slaughtered poultry, wherein carcasses breast parts of slaughtered poultry are conveyed by a feed conveyor, said feed conveyor having an endless track and carriers that are moved along said track, each feed conveyor carrier being adapted to support one carcass breast part, wherein each individual carcass breast part is subjected to at least one of:

a determination of the individual carcass breast part weight by a weighing device, and a determination of the individual carcass breast part size by an imaging device, wherein for filleting the carcass breast parts, use is made of a first filleting line and a second filleting line, wherein each filleting line has an associated filleting line conveyor, said filleting line conveyor having an endless track and carriers that are moved along said track, each filleting line conveyor carrier being adapted to support one carcass breast part, wherein each filleting line comprises one or more filleting process devices arranged along the track, which one or more filleting process devices perform a filleting process operation on the carcass breast part supported by a filleting line conveyor carrier, wherein the filleting line conveyor of each of said first and second filleting lines is adapted for direct transfer of a carcass breast part from a carrier of the feed conveyor to a carrier of the filleting line, wherein use is made of a computerized production control system which—based on at least one of the determination of each individual carcass breast part weight made by the weighing device and the determination of the individual carcass breast part size by the imaging device—grades each of the carcass breast parts conveyed by the feed conveyor into one carcass breast part size category of N categories, at least including a first and a second carcass breast part size category, each category containing differently size carcass breast parts, wherein the production control system controls each transfer such that carcass breast parts in the each carcass breast part size category are transferred—to the greatest extent possible—from the feed conveyor to the respective filleting line conveyor, wherein the computerized production control system makes use of an intermediate carcass breast part size category between each pair of adjacent carcass breast part categories, and wherein the computerized production control system grades each of the carcass breast parts that are conveyed by the feed conveyor and are to be processed by one of two filleting lines that each correspond to one of said pair of adjacent breast part categories into one of three categories:

said first carcass breast part size category, said second carcass breast part size category, and an intermediate carcass breast part size category, and wherein the computerized production control system determines in real-time—for the first filleting line conveyor and for the second filleting line conveyor—the capacity of each of said filleting line conveyors to receive carcass breast parts of the respective first carcass breast part size and second carcass breast part size category from the feed conveyor, and wherein the production control system determines in real-time—for the first filleting line conveyor and for the second filleting line conveyor—a respective remaining capacity to receive carcass breast parts from the feed conveyor in the situation that the carcass breast parts in the first carcass breast part size and second carcass breast part size categories have—to the greatest extent possible—been allocated to the respective combination, and wherein the production control system controls the direct transfers such that the carcass breast parts in the intermediate carcass breast part size category are distributed over said first and second filleting lines on the basis of the determined remaining capacity of each of said filleting lines.

11. The method according to claim 10, wherein each oven-ready carcass is suspended by its legs from a carrier of the feed conveyor and wherein a carcass breast part has been partly cut loose from said suspended oven-ready carcass, and wherein the carriers of each of the filleting line conveyors are selectively movable on command into a receiving position and a non-receiving position with respect to the feed conveyor, and are being moved into the receiving position if a carcass breast part is to be transferred from an oven-ready carcass suspended by its legs from a carrier of the feed conveyor to a carrier of the filleting line conveyor.

12. The method according to claim 10, wherein the grading of the carcasses into said one of three categories is performed primarily or solely on the basis of the weight of each individual carcass or carcass breast part, wherein the production control system makes use of a first weight limit and a second weight limit that is higher than the first limit, the carcasses or carcass breast part being categorised:

in said small carcass or carcass breast part size category if the weight of said carcass or carcass breast part is below a first weight limit, in said large carcass or carcass breast part size category if the weight of said carcass or carcass breast part is above a second weight limit that is higher than the first weight limit, and in said intermediate carcass or carcass breast part size category if the weight of said carcass or carcass breast part is between the first and second weight limits.

13. The method according to claim 10, wherein the computerized production control system provides in real-time an operator alarm signal for an operator person if for one or both of said filleting lines or combination of filleting line and transfer device the capacity to receive carcass breast parts of the respective first carcass breast part size and second carcass breast part size category from the feed conveyor is insufficient, the control system possibly being configured to allow the operator person in real-time to cause carcass breast parts to be removed from the feed line other than via the first and second transfer devices or the filleting conveyor, and/or the control system possibly being configured to allow the operator to override the computerized category grading of carcasses in order to re-allocate one or more carcasses in said first carcass breast part size category or second carcass breast part size category to another of said three categories.

14. The method according to claim 10, wherein the control system is configured to treat all carcasses or carcass breast parts in the intermediate carcass or carcass breast part size category without any differentiation in view of the distribution over the two cut-up lines or pair of filleting lines.

15. An installation for processing slaughtered poultry, wherein the installation has:
   a feed conveyor to convey oven-ready carcasses of slaughtered poultry, said feed conveyor having an endless track and carriers that are moved along said track, the feed conveyor carrier being adapted to support one carcass suspended from its legs,
   a station including at least one of a weighing device and an imaging device, wherein each individual carcass is subjected to at least one of:
   a determination of the individual carcass weight by a weighing device, and
   a determination of the individual carcass size by an imaging device,
   a first cut-up line and a second cut-up line, each for dividing an oven-ready carcass into parts,
   wherein each cut-up line has an associated cut-up line conveyor, said cut-up line conveyor having an endless track and carriers that are moved along said track, each cut-up line conveyor carrier being adapted to support one carcass suspended from its legs,
   wherein each cut-up line comprises one or more cutting devices arranged along the track, which one or more cutting devices are adapted to divide a carcass supported by a cut-up line conveyor carrier into parts,
      a first transfer device arranged between the feed conveyor and the first cut-up line conveyor, which transfer device is adapted to transfer carcasses from said feed conveyor to said first cut-up line conveyor,
      a second transfer device arranged between the feed conveyor and the second cut-up line conveyor, which transfer device is adapted to transfer carcasses from said feed conveyor to said second cut-up line conveyor,
      a computerized production control system which is programmed—based on at least one of the determination of each individual carcass weight made by the weighing device and the individual carcass size by the imaging device—to grade each of the carcasses conveyed by the feed conveyor and are to be processed on one of the two cut-up lines into one of three categories:
      said small carcass size category,
      said large carcass size category, and
      an intermediate carcass size category,
   wherein the production control system is programmed to control the first transfer device such that carcasses in the small carcass size category are transferred—to the greatest extent possible—from the feed conveyor to the first cut-up line conveyor,
   wherein the production control system is programmed to control the second transfer device such that carcasses in the large carcass size category are transferred—to the greatest extent possible—from the feed conveyor to the second cut-up line conveyor,
   and wherein the computerized production control system is programmed to determine in real-time—for a combination of the first transfer device and the first cut-up line conveyor and for a combination of the second transfer device and the second cut-up line conveyor—the capacity of each of said combinations to receive carcasses of the respective small carcass size category and large carcass size category from the feed conveyor,
   and wherein the production control system is programmed to determine in real-time—for said combination of the first transfer device and the first cut-up line conveyor and for said combination of the second transfer device and the second cut-up line conveyor—a respective remaining capacity to receive carcasses from the feed conveyor in the situation that the carcasses in the small carcass size and large carcass size categories have—to the greatest extent possible—been allocated to the respective combination,
   and wherein the production control system is programmed to control the first and second transfer devices such that the carcasses in the intermediate carcass size category are distributed over said combinations on the basis of the determined remaining capacity of each of said combinations.

16. An installation for processing slaughtered poultry, wherein the installation has:
   a feed conveyor for carcass breast parts of slaughtered poultry, said feed conveyor being adapted to convey a stream of individual carcass breast parts in sequential order,
   a station comprising at least one of a weighing device and an imaging device, which station is adapted to subject each individual carcass breast part to at least one of:
   a determination of the individual carcass breast part weight by the weighing device, and
   a determination of the individual carcass breast part size by the imaging device,
   at least a first filleting line and a second filleting line adapted for filleting the carcass breast parts,
   wherein each filleting line has an associated filleting line conveyor, said filleting line conveyor having an endless track and carriers that are movable along said track, each filleting line conveyor carrier being adapted to support one carcass breast part,
   wherein each filleting line comprises one or more filleting process devices arranged along the track, which one or more filleting process devices are adapted to perform a filleting process operation on the carcass breast part supported by a filleting line conveyor carrier,
      a first transfer device arranged between the feed conveyor and the first filleting line conveyor, which first transfer device is adapted to transfer carcass breast parts from said feed conveyor to said first filleting line conveyor,
      a second transfer device arranged between the feed conveyor and the second filleting line conveyor, which second transfer device is adapted to transfer carcasses from said feed conveyor to said second filleting line conveyor,
      a computerized production control system which is programmed to perform the steps of:
         grading, based on at least one of the determination of each individual carcass breast part weight made by the weighing device and the determination of the individual carcass breast part size by the imaging device, each of the carcass breast parts conveyed by the feed conveyor into one carcass breast part size category, at least including a first carcass breast part size category, a second carcass breast part size category, and an intermediate carcass breast part size category, each of said categories containing differently sized carcass breast parts,
         controlling each of said first and second transfer devices such that carcass breast parts in each carcass breast part size category are transferred—to the greatest extent possible—from the feed conveyor to a respective filleting line conveyor, determining in real-time—for a combination of the first filleting line conveyor and the respective first transfer device and for a combination of the second filleting line conveyor and the respective second transfer device—the capacity of each of said combinations to receive carcass breast parts of the respective first carcass breast part size category and second carcass breast part size category from the feed conveyor, determining in real-time—for said combination of the first transfer device and the first filleting line conveyor and for said combination of the second transfer device and the second filleting line conveyor—a respective remaining capacity to receive carcass breast parts from the feed conveyor in the situation that the carcass breast parts in the first carcass breast part size and second carcass breast part size categories have—to the greatest extent possible—been allocated to the respective combination, controlling the first and second transfer devices such that the carcass breast parts in the intermediate carcass breast part size category are distributed over said combinations on the basis of the determined remaining capacity of each of said combinations.

17. An installation for processing slaughtered poultry, wherein the installation has:

a feed conveyor adapted to convey carcasses breast parts of slaughtered poultry, said feed conveyor having an endless track and carriers that are movable along said track, each feed conveyor carrier being adapted to support one carcass breast part, a station comprising at least one of a weighing device and an imaging device, wherein the station is adapted to subject each individual carcass breast part to at least one of:

a determination of the individual carcass breast part weight by a weighing device, and a determination of the individual carcass breast part size by an imaging device, at least a first filleting line and a second filleting line adapted for filleting the carcass breast parts, wherein each filleting line has an associated filleting line conveyor, said filleting line conveyor having an endless track and carriers that are movable along said track, each filleting line conveyor carrier being adapted to support one carcass breast part, wherein each filleting line comprises one or more filleting process devices arranged along the track, which one or more filleting process devices are adapted to perform a filleting process operation on the carcass breast part supported by a filleting line conveyor carrier, wherein the filleting line conveyor of each of said first and second filleting lines is adapted for direct transfer of a carcass breast part from a carrier of the feed conveyor to a carrier of the filleting line, a computerized production control system which is programmed to perform the steps of:

grading, based on at least one of the determination of each individual carcass breast part weight made by the weighing device and the determination of the individual carcass breast part size by the imaging device, each of the carcass breast parts conveyed by the feed conveyor into one carcass breast part size category of N categories, at least including a first carcass breast part size category, a second carcass breast part size category, and an intermediate carcass breast part size category, each of said categories containing differently sized carcass breast parts, controlling each of said direct transfers such that carcass breast parts in the each carcass breast part size category are transferred—to the greatest extent possible—from the feed conveyor to a respective filleting line conveyor, determining in real-time—for the first filleting line conveyor and for the second filleting line conveyor—a capacity of each of said filleting line conveyors to receive carcass breast parts of the respective first carcass breast part size and second carcass breast part size category from the feed conveyor, determining in real-time—for the first filleting line conveyor and for the second filleting line conveyor—a respective remaining capacity to receive carcass breast parts from the feed conveyor in the situation that the carcass breast parts in the first carcass breast part size and second carcass breast part size categories have—to the greatest extent possible—been allocated to the respective filleting line conveyor, controlling said direct transfers from the feed conveyor to said first and second filleting line conveyors such that the carcass breast parts in the intermediate carcass breast part size category are distributed over said first and second filleting lines on the basis of the determined remaining capacity of each of said filleting lines.

* * * * *